US010458772B2

(12) United States Patent
Cobb et al.

(10) Patent No.: US 10,458,772 B2
(45) Date of Patent: Oct. 29, 2019

(54) CMM APPARATUS FOR IDENTIFYING AND CONFIRMING THE STYLUS

(71) Applicant: Hexagon Metrology, Inc., North Kingstown, RI (US)

(72) Inventors: Zachary Cobb, Newport, RI (US); Gurpreet Singh, Providence, RI (US); Milan Kocic, Pawtucket, RI (US)

(73) Assignee: Hexagon Metrology, Inc., North Kingstown, RI (US)

( * ) Notice: Subject to any disclaimer, the term of this patent is extended or adjusted under 35 U.S.C. 154(b) by 219 days.

(21) Appl. No.: 15/624,412

(22) Filed: Jun. 15, 2017

(65) Prior Publication Data

US 2017/0363402 A1    Dec. 21, 2017

Related U.S. Application Data

(60) Provisional application No. 62/350,492, filed on Jun. 15, 2016.

(51) Int. Cl.
*G01B 5/008* (2006.01)
*G01B 21/04* (2006.01)

(52) U.S. Cl.
CPC ........... *G01B 5/008* (2013.01); *G01B 21/047* (2013.01); *G01B 2210/60* (2013.01); *G05B 2219/37193* (2013.01)

(58) Field of Classification Search
CPC ....................................................... G01B 5/008
USPC ..................................................... 33/503, 504
See application file for complete search history.

(56) References Cited

U.S. PATENT DOCUMENTS

| 4,658,509 A | * | 4/1987 | Juengel | G01B 7/012 33/558 |
| 5,150,529 A | * | 9/1992 | Collingwood | G01B 21/047 33/503 |
| 5,778,550 A | * | 7/1998 | Carli | B23Q 17/24 33/503 |
| 5,825,666 A | | 10/1998 | Freifeld | |
| 7,316,077 B2 | * | 1/2008 | Fuge | G01B 7/002 33/504 |
| 7,392,692 B2 | * | 7/2008 | Noda | G01B 5/008 33/503 |

(Continued)

FOREIGN PATENT DOCUMENTS

| DE | 10057284 A1 | 5/2002 |
| DE | 102010006382 A1 | 8/2011 |

(Continued)

OTHER PUBLICATIONS

US 8,402,270 B2, 03/2013, Prestidge et al. (withdrawn)

(Continued)

*Primary Examiner* — George B Bennett
(74) *Attorney, Agent, or Firm* — Nutter McClennen & Fish LLP (57) ABSTRACT

Various embodiments improve the performance and reliability of coordinate measuring machines by verifying that coordinate measuring machine is configured to use the appropriate probe or stylus for measuring an object. In some embodiments, confirmation that the appropriate probe or stylus is mounted is built into an automated part of the CMM's measurement process, thereby assuring that a confirmation step is performed and that the outcome is correct.

20 Claims, 7 Drawing Sheets

(56) References Cited

U.S. PATENT DOCUMENTS

| | | |
|---|---|---|
| 8,352,212 B2 | 1/2013 | Fetter et al. |
| 8,464,054 B2 | 6/2013 | Prestidge et al. |
| 2001/0034948 A1* | 11/2001 | Matsumiya ............ G01B 7/012 33/553 |
| 2004/0103548 A1* | 6/2004 | Jordil .................... G01B 7/008 33/504 |
| 2009/0028286 A1* | 1/2009 | Prestidge ............... G01B 5/012 377/15 |
| 2009/0049704 A1* | 2/2009 | Styles .................... G01B 5/012 33/503 |
| 2015/0049186 A1 | 2/2015 | Pettersson et al. |
| 2015/0253125 A1 | 9/2015 | Pettersson |
| 2015/0285616 A1 | 10/2015 | Jordil |

FOREIGN PATENT DOCUMENTS

| | | |
|---|---|---|
| DE | 102015119440 A1 | 3/2017 |
| EP | 2930462 A1 | 10/2015 |
| JP | 62-264839 A | 11/1987 |

OTHER PUBLICATIONS

International Searching Authority [EPO], International Search Report—International Application No. PCT/US2017/037755, dated Aug. 16, 2017, together with the Written Opinion of the International Searching Authority [EPO], 15 pages.

\* cited by examiner

CMM APPARATUS FOR IDENTIFYING AND CONFIRMING THE STYLUS

RELATED APPLICATIONS

This patent application claims priority from provisional U.S. patent application No. 62/350,492, filed Jun. 15, 2016, entitled, "CMM Apparatus for Identifying and Confirming the Stylus," and naming Zachary Cobb, Gurpreet Singh, and Milan Kocic as inventors, the disclosure of which is incorporated herein, in its entirety, by reference.

FIELD OF THE INVENTION

The disclosure generally relates to coordinate measuring machines and, more particularly, relates to systems and methods for operating coordinate measuring machines.

BACKGROUND OF THE INVENTION

Coordinate measuring machines (CMMs) are the gold standard for accurately measuring a wide variety of different types of work pieces/objects. For example, CMMs can measure critical dimensions of aircraft engine components, surgical tools, and machine parts. Precise and accurate measurements help ensure that their underlying systems, such as an aircraft in the case of aircraft components, operate as specified.

Some objects are measured to a fine precision, such as on the micron level. The accuracy of a CMM may depend, in part, on the measuring device (e.g., probe) used for the measurement.

SUMMARY OF VARIOUS EMBODIMENTS

In accordance with one embodiment, a method of operating a coordinate measuring machine confirms the probe before starting or completing the measurement process. To that end, the method detects a probe, and assesses whether the probe meets a specification. If the probe meets the specification, then the method measures the object with the detected probe.

If the probe does not meet the specification, then the method temporarily suspends the process and replaces the probe with a different probe, sends a message indicating that the probe does not meet the specification, and/or stops the entire process.

In accordance with another embodiment, a method of operating a coordinate measuring machine confirms the stylus before starting or completing the measurement process. To that end, the method detects a stylus, and assesses whether the stylus meets a specification. If the stylus meets the specification, then the method measures the object with the detected stylus.

If the stylus does not meet the specification, then the method temporarily suspends the process and replaces the stylus with a different stylus, sends a message indicating that the stylus does not meet the specification, and/or stops the entire process.

In an illustrative embodiment, a computer-implemented method of operating a coordinate measuring machine is configured to measure an object according to a criterion associated with the object, which criterion identifies a specific probe type with which the object is to be measured. The method includes (automatically) detecting an indicium of an available probe, and assessing whether the indicium of the available probe meets the criterion specified for the object to be measured, and controlling the a coordinate measuring machine to measure the object with the available probe, when the indicium meets the criterion.

In some embodiments, the criterion identifies a specific probe, and assessing whether the indicium of the available probe meets the criterion includes determining whether the available probe is the specific probe.

In some embodiments, the indicium is a passive indicium, and may be an optically readable indicium or a physical indicium that is configured to be detected by another probe on the coordinate measuring machine.

In some embodiments, detecting an indicium of an available probe includes detecting the indicium prior to mounting the available probe to the coordinate measuring machine.

In some embodiments, the method further includes locating a second probe when the available probe fails to meet the criterion.

Another embodiment includes a coordinate measuring machine system operable to measure an object. The system includes a moveable arm configured to move a probe, relative to the object to be measured, a first probe configured to be removably coupled to the arm, the first probe having a first indicium, and a second probe configured to be removably coupled to the arm, the second probe having a second indicium that is distinguishable from the first indicium.

In some embodiments, the first indicium is a passive indicium. The indicium may be, for example, an optically readable indicium, or a physical indicium that is configured to be detected by another probe on the coordinate measuring machine.

The system includes a controller configured to select, based on at least one of the first indicia and the second indicia, one of the first probe and the second probe for use by the coordinate measuring machine to measure the object, said probe being a selected probe. In some embodiments, the controller is further configured to select one of the first probe and the second probe by correlating at least one of the first indicia and the second indicia to a probe criterion specified for the object.

Moreover, in some embodiments, the controller is configured to robotically mount the selected probe to the moveable arm, and/or to measure the object with the selected probe mounted to the moveable arm.

Yet another embodiment includes a probe configured for mounting to a coordinate measuring machine, the coordinate measuring machine configured to couple to the probe and a second probe. In such an embodiment, the probe includes a probe body, and a probe indicium associated with the probe body. The probe indicium is unconcealed, and is configured to distinguish the probe from the second probe.

In some embodiments, the indicium is a passive indicium, and may be an optically readable indicium. In a coordinate measuring machine that includes a camera, and the probe indicium is optically readable by the camera, such as a bar code for example. In some embodiments, the indicium is a physical indicium that is detectable by another probe on the coordinate measuring machine.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Various embodiments improve the performance and reliability of coordinate measuring machines ("CMMs") by verifying that a CMM uses the appropriate probe or stylus for measuring an object. In some embodiments, confirmation of the appropriate probe or stylus is built into an automated part of the CMM's measurement process, thereby assuring that a confirmation step is performed and that the outcome is correct. Consequently, some embodiments improve the performance and reliability of CMMs by providing a double-check on a CMM operator's selection of a probe and/or stylus for the measurement task to be performed. Indeed, some embodiments remove a human operator from the process of selecting and/or verifying that the CMM has the correct probe or stylus for the measurement task to be performed.

Figure 1A:
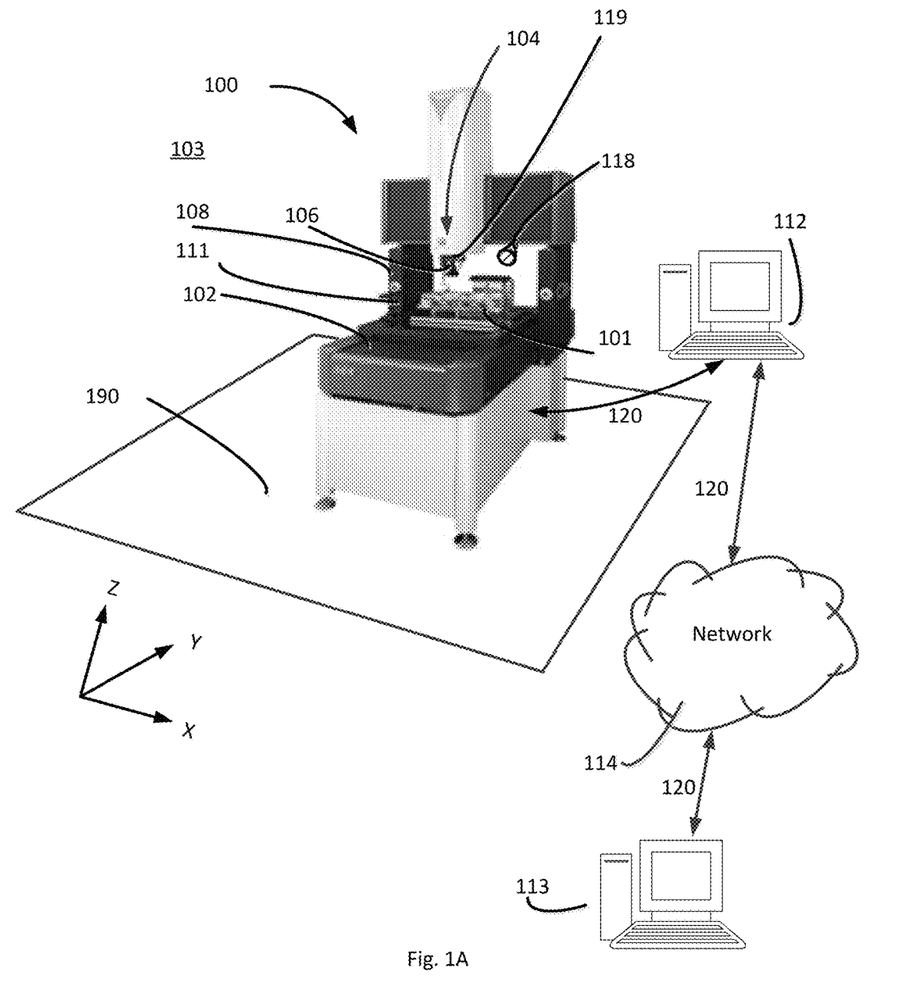
FIG. 1A schematically illustrates a coordinate measuring machine that may implement various embodiments of the invention.

FIG. 1A is a modified photograph of one type of coordinate measuring machine 100 ("CMM 100") that may be configured in accordance with illustrative embodiments. As known by those in the art, the CMM 100, which is within some surrounding environment 103 (e.g., a clean room or an area near an assembly line), including a floor 190, measures an object 101 on its bed/table/base (referred to as "base 102"). Generally, the base 102 defines an X-Y plane that typically is parallel to the plane of the floor 190 supporting the CMM 100.

To measure the object 101 on its base 102, the CMM 100 has movable features 104 arranged to move a measuring device 106 (individually or collectively, a measuring apparatus), such as a mechanical, tactile probe (e.g., a touch trigger or a scanning probe in a standard CMM), a non-contact probe (e.g., using laser probes), or a camera (e.g., a machine-vision CMM), coupled with a movable arm 104. Alternately, some embodiments move the base 102 with respect to a stationary measuring device 106. Either way, the movable features 104 of the CMM 100 manipulate the relative positions of the measuring device 106 and the object 101 (or calibration artifact) with respect to one another to obtain the desired measurement. Accordingly, the CMM 100 can effectively measure the location of a variety of features of the object 101 or artifact.

The CMM 100 has a motion and data control system 108 ("control system 108," shown schematically in FIG. 1A) that controls and coordinates its movements and activities. Among other things, the control system 108 includes computer processor hardware and the noted movable features 104. The computer processor 111 may include a microprocessor, programmable logic, firmware, advance control, acquisition algorithms, parts programs, and analysis algorithms. The computer processor 111 may have on-board digital memory (e.g., RAM or ROM) for storing data and/or computer code, including instructions for implementing some or all of the control system operations and methods. Alternately, or in addition, the computer processor 111 may be operably coupled to other digital memory, such as RAM or ROM, or a programmable memory circuit for storing such computer code and/or control data.

Alternately, or in addition, some embodiments couple the CMM 100 with an external or integral computer 112 ("host computer 112"). In a manner similar to the control system 108, the host computer 112 has a computer processor such as those described above, and computer memory in communication with the processor of the CMM 100. The memory is configured to hold non-transient computer instructions capable of being executed by the processor, and/or to store non-transient data, such as data acquired as a result of the measurements of the object 101 on the base 102.

Among other things, the host computer 112 may be a desktop computer, a tower computer, or a laptop computer, such as those available from Dell Inc., a tablet computer, such as the iPad available from Apple Inc., or a smartphone.

The host computer 112 may be coupled to the CMM 100 via a data connection 120, which in various embodiments may be hardwired connection, such as an Ethernet cable, or via a wireless link, such as a Bluetooth link or a WiFi link, to name but a few examples. The host computer 112 may, for example, include software to control the CMM 100 during use or calibration, and/or may include software configured to process data acquired during a calibration process. In addition, the host computer 112 may include a user interface configured to allow a user to manually operate the CMM 100.

To facilitate communications, the computer 112 may be connected in some manner, such as a data connection 120, to a larger network 114, such as a local area network or a wide area network. For example, the network 114 in FIG. 1A may include a local area network connected to the Internet. Accordingly, the computer 112 may communicate with remote devices 113 (e.g., computers, servers, routers, remote computers, etc.) via the network 114.

Although the above discussion discloses the specific CMM 100, it should be apparent that other CMMs may implement illustrative embodiments. Accordingly, the CMM 100 of FIG. 1A is illustrative and not intended to limit various other embodiments.

Figure 1B:
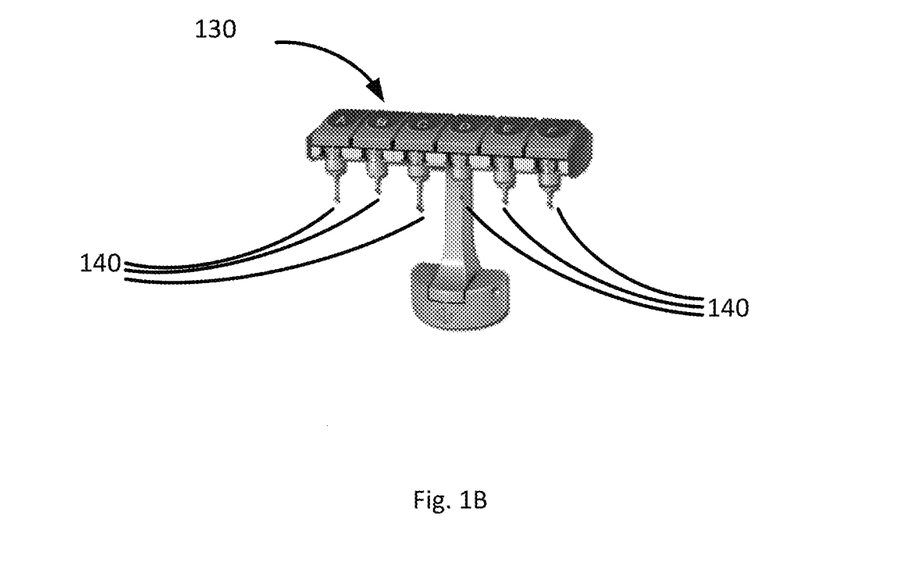
FIG. 1B schematically illustrates a probe rack that may be used with illustrative embodiments of the invention.

The CMM 100 can retrieve probes 140 in a variety of ways. For example, FIG. 1B schematically illustrates a probe rack 130 configured to hold one or more probes 140. Each of the probes 140 may be coupled with the movable arm 104 of the CMM 100, and accordingly functions as the above noted measuring device 106. Moreover, each probe 140 may be any one of a variety of types of probes, such as those described above (e.g., a mechanical, tactile probe, a non-contact probe such as an optical probe), to name but a few examples.

In operation, a probe 140 may be changed, removed from and/or coupled to the movable arm 104 of the CMM 100, either manually by an operator, or automatically (robotically; not manually) by the CMM 100. For example, the probe 140 may be removably coupled to probe interface 119. To that end, FIG. 2A describes a process for assessing the identity of a probe 140 coupled to the CMM 100, for example to confirm that the probe 140 is appropriate for the measuring task to be performed by the CMM 100. It should be noted that this process is substantially simplified from a longer process that normally would be used to operate the CMM 100. Accordingly, the process of FIG. 2A has many steps, such as object positioning and calibration steps, which those skilled in the art likely would use. In addition, some of the steps may be performed in a different order than that shown, or at the same time. Those skilled in the art therefore can modify the process as appropriate.

Figure 2A:
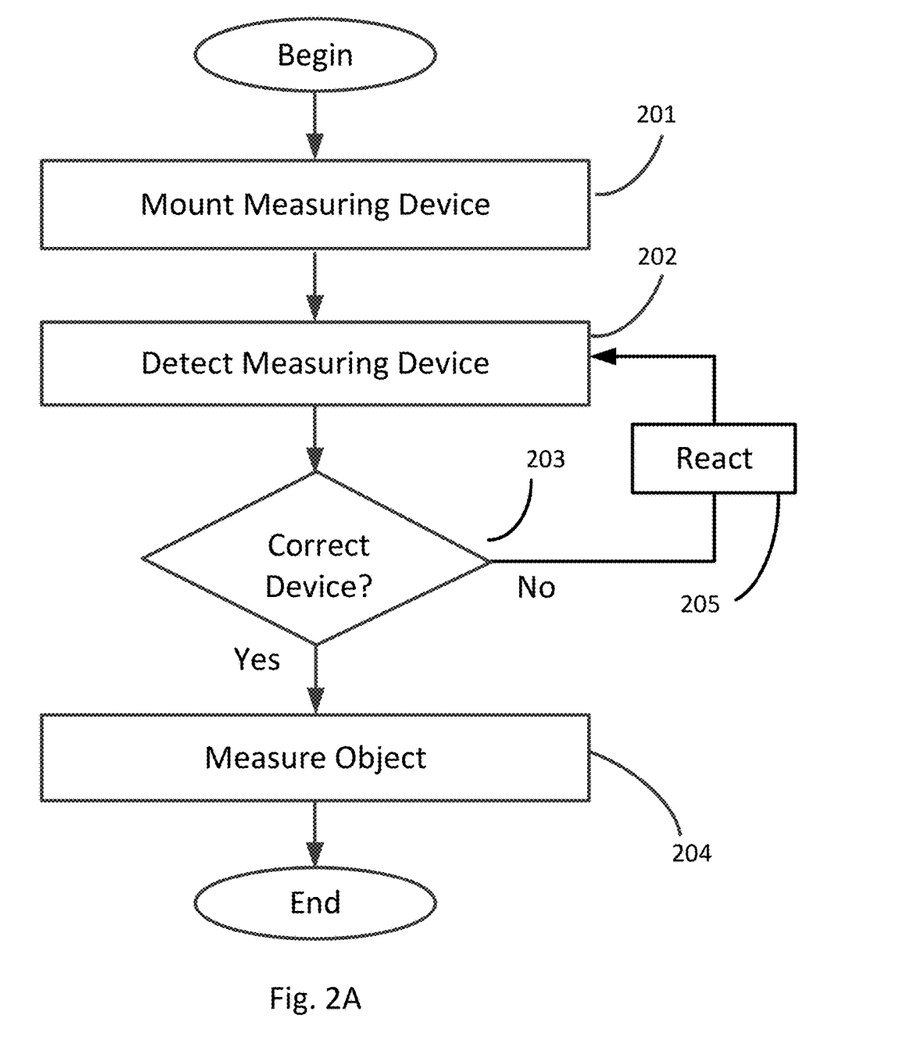
FIG. 2A shows a method of operating a CMM in accordance with illustrative embodiments of the invention.

The process of FIG. 2A begins at step 201, in which an available probe 140 is mounted to the CMM 100. For example, the probe 140 may be selected from the probe rack 130 and mounted to the movable arm 104.

At step 202, the CMM 100 detects the identity of the probe 140. The identity of a probe 140 may include the type of probe (e.g., tactile; non-contact; optical), and/or may include a specific identification (e.g., serial number of a probe 140). In some embodiments, the CMM may detect the identity of a probe 140 prior to mounting (coupling) the probe to the CMM, and may mount the probe to the CMM only after confirming the identity of the probe 140. The process of FIG. 2B, discussed below, describes one process of detecting the identity of the probe 140.

At step 203, the process assesses the identity of the probe 140 to determine whether the probe 140 meets a criterion for the measuring task to be performed by the CMM 100. For example, such a criterion may specify that a given measurement process of a given object to be performed by the CMM 100, or a part of such a measurement, is to use a specific probe 140. Such a specification may depend on the object to be measured, such that the specification (criterion) correlates a probe or probe type to the object.

Some probes 140 may be configured to operate with a specific type of stylus 141. For example, some probes 140 may have an interface 149 that includes sensors to detect deflection of a tactile stylus 141 when that stylus contacts an object. Other probes 140 may have an interface 149 (which may be referred to as a "stylus interface") that includes electronics to receive electrical signals, such as from an optical stylus for example. Thus, in some embodiments, step 203 assesses the identity of the probe 140 to assess whether that probe 140 is, or can be adapted (e.g., by coupling an appropriate stylus 141 to the probe) to meet the specification.

The specification of that probe 140 is a criterion, and step 203 assesses the identity of the probe 140 to determine whether the indicium 147 of the probe 140 matches that criterion. For example, if the measuring task to be performed by the CMM 100 includes measuring an object 101 with a specific type of non-contact probe 140, the process confirms that the probe 140 is that specific type of non-contact probe, or is capable of holding a non-contact stylus 141.

If the identity of the probe 140 is confirmed, the process continues to step 204, which measures the object 101. Otherwise, the process proceeds to step 205, at which a different probe 140 may be selected, for example from the probe rack 130, and the process loops back to step 202 to detect this new probe 140.

Alternately, in some embodiments, the reaction at step 205 includes suspending the process of preparing to measure the object 101, and alerting an operator or remote system (113) that an error has occurred. In some embodiments, a CMM 100 may have a first probe 140 (e.g., configured to be removably coupled to the arm 104), the first probe having a first indicium, and a second probe 140 (e.g., also configured to be removably coupled to the arm 104), the second probe comprising a second indicium that is distinguishable from the first indicium. The CMM 100 (e.g., the controller 108) is configured to select, based on at least one of the first indicia and the second indicia, one of the first probe and the second probe for use by the coordinate measuring machine. Said probe may be referred to as the "selected probe." The controller in such embodiments may be configured to robotically mount the selected probe 140 to the moveable arm 104, and to control the arm 104 to measure the object with the selected probe mounted to the moveable arm.

Figure 2B:
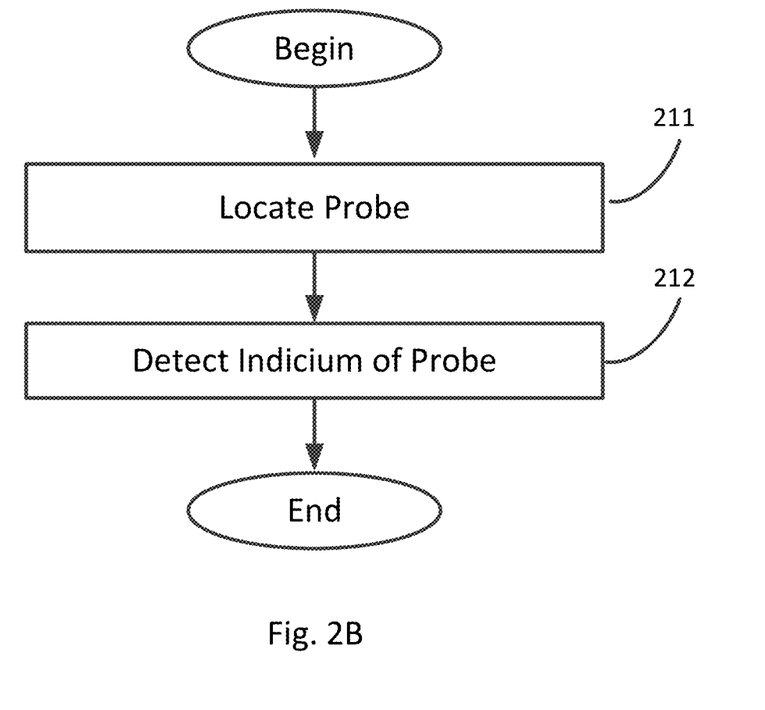
FIG. 2B shows a method of confirming a measuring device for use by a CMM in accordance with illustrative embodiments of the invention.

FIG. 2B describes a process for detecting the identity of the probe 140 at step 203 of FIG. 2A.

The process of FIG. 2B begins at step 211, in which the process locates a probe 140 to be identified (which may be referred to as an "available probe"). In some embodiments, the probe 140 may be on a rack 130, or may already be attached to the CMM 100. The process may locate the probe 140 by, for example, moving the arm 104 to the rack 130, or by detecting an image of the probe 140 using camera 118 or other vision system.

Next, step 212 of the process automatically detects an indicium 147 of the probe 140. The indicium 147 of the probe 140 indicates the identity of the probe 140 with which the indicium 147 is associated. Among other things, the indicium 147 may identify the type of the probe (e.g., tactile or non-contact), or may identify the specific probe (e.g., by serial number). In other words, an indicium of a probe 140 may distinguish one type of probe 140 from another type of probe 140, and/or may distinguish one probe 140 from another probe 140 (even if both probes 140 are of the same type). The coordinate measuring machine 100 may detect the indicium 147 of the probe 140 by use of a camera 118 under control of the controller 108, for example if the indicium is a bar code or other visible feature or optically readable feature, or by use of another probe 140 operated by the coordinate measuring machine 100, for example if the indicium 147 is a physical feature.

Figure 1C:
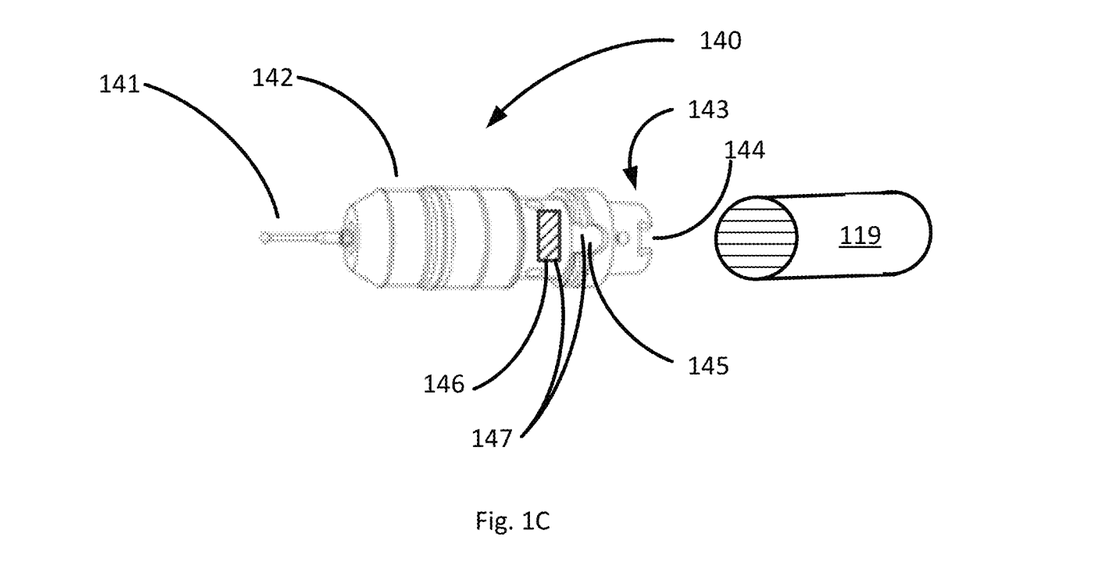
FIG. 1C schematically illustrates an embodiment of a probe that may be used with illustrative embodiments.

Several embodiments of indicia 147 are schematically illustrated in FIG. 1C, which includes a probe 140 having a body 142 and a stylus 141. Generally, a probe indicium 147 is not hidden or secret, but instead is unconcealed so as to be easily detectable by the CMM 100. For example, the probe indicium 147 is at least partially exposed, is apparent and easily detectible from the outside of the probe 140, for example with a camera 118, or by another probe 140 used by the coordinate measuring machine 100. In some embodiments, the probe indicium is passive, in that it can be read or assessed by the CMM 100 without requiring action by, or modification of, the indicium 147. Examples of a passive probe indicium 147 include a bar code or other visible indicium, or a physical feature (e.g., a notch) that can be detected by the CMM 100.

The probe 140 mounts to the CMM 100 using a physical interface 143. The physical interface 143 may include an indicium 147 in the form of a physical feature 144 that uniquely identifies the probe 140, or its type. A corresponding probe interface 119 on the CMM, alone or in concert with the controller or computer 112, may confirm the identity of the probe 140 by sensing the physical feature 144.

In another embodiment, the body 142 of the probe 140 includes a surface feature 145 that uniquely identify the probe 140, or its type, and which may be detected by the CMM, for example using camera 118. For example, the surface feature 145 may include raised text, a color, or recesses in a specified pattern.

In another embodiment, the body 142 of the probe 140 includes an identity interface 146 that uniquely identifies the probe 140, or its type. For example, the identity interface 146 may be an optically readable feature such as bar code, color, or other optical indicia that may be read by camera 118. In other embodiments, the interface 146 may be an electrical interface configured to make electrical contact with the CMM 100, and generate an electrical signal with a pattern that uniquely identifies the probe 140. For example, this interface 146 may be a part of the probe interface 143 that couples with the CMM arm 104.

In other embodiments, the interface 146 may be a transmitter, such as an RFID chip, that transmits an identifier that uniquely identifies the probe 140, for example in response to a query from the CMM 100. In yet other embodiments, step 212 of FIG. 2B may identify a probe 140 by measuring one or more distinguishing physical features of the probe 140, such as its length, width, or shape.

Figure 1D:
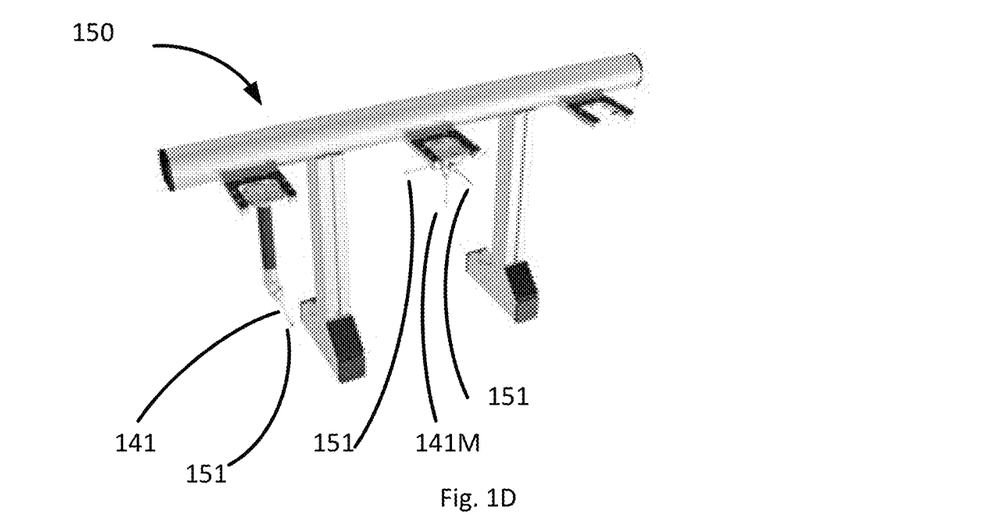
FIG. 1D schematically illustrates a stylus rack that may be used with illustrative embodiments of the invention.

In other embodiments, the CMM 100 may obtain or retain a probe 140, but select or replace a stylus 141, such as one associated with the probe 140. A CMM 100 can retrieve a stylus 141 in a variety of ways. For example, FIG. 1D schematically illustrates a stylus rack 150 configured to hold one or more styli 141. Each stylus 141 may be coupled with a probe 140, and thereby coupled to the movable arm 104 of the CMM 100, and accordingly functions as the above-noted measuring device 106. Moreover, each stylus 141 may be any one of a variety of types of stylus, such as a single-headed stylus having a single stylus tip 151 (e.g., FIG. 1E), or a multi-headed-stylus 141M having more than one stylus tip 151 (e.g., FIG. 1D), and may be a tactile stylus (e.g., a stylus that measures an object by contacting the object), or a non-contact stylus (e.g., a stylus that measures an object without contacting the object), to name but a few examples.

In operation, a stylus 141 may be changed, removed from and/or coupled to a probe 140, either manually by an operator, or automatically (robotically) by the CMM 100. For example, the stylus 141 may be removably coupled to the probe body 142. To that end, FIG. 3A describes a process for assessing the identity of a stylus 141 coupled to a probe 140, for example to confirm that the stylus 141 is appropriate for the measuring task to be performed by the CMM 100. It should be noted that this process is substantially simplified from a longer process that normally would be used to operate the CMM 100. Accordingly, the process of FIG. 3A has many steps, such as object positioning and calibration steps, which those skilled in the art likely would use. In addition, some of the steps may be performed in a different order than that shown, or at the same time. Those skilled in the art therefore can modify the process as appropriate.

Figure 3A:
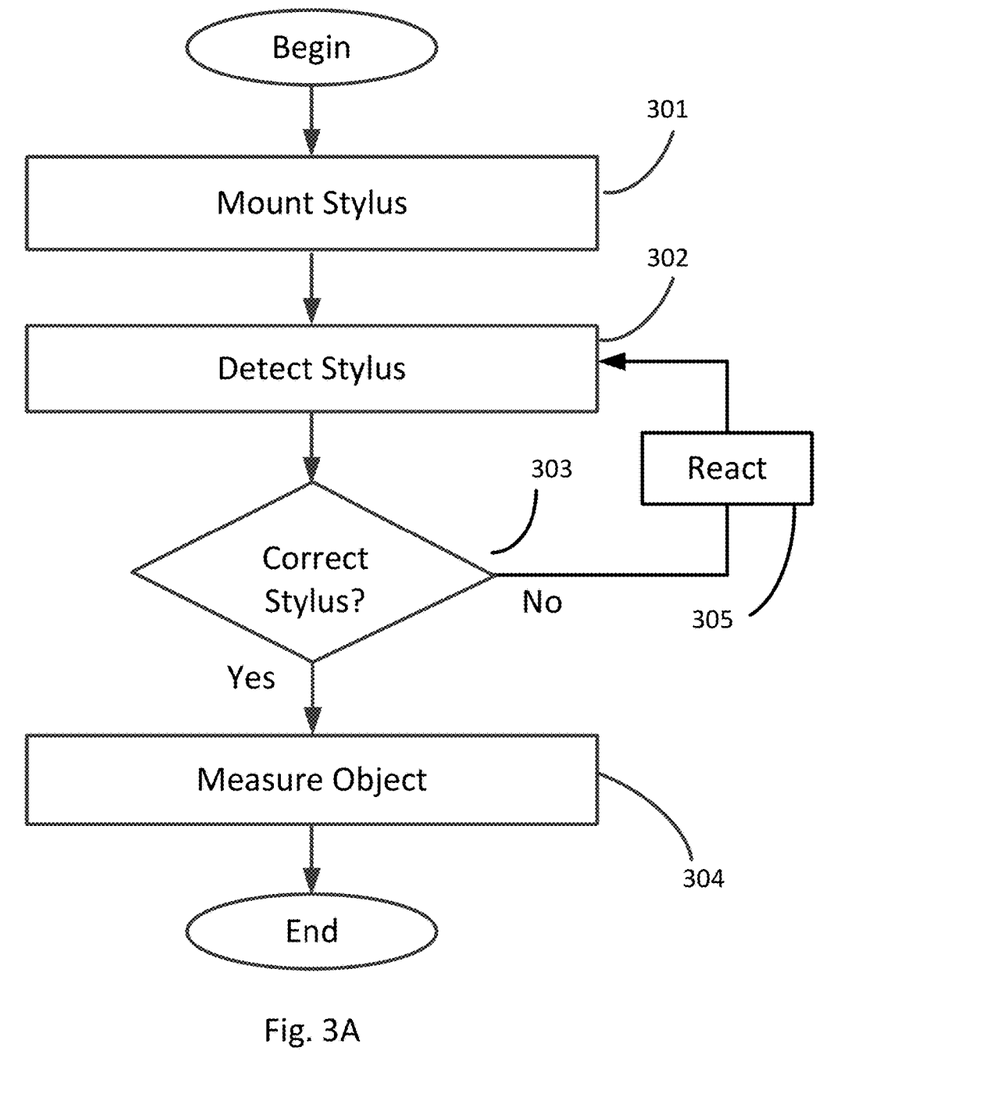
FIG. 3A shows a method of operating a CMM in accordance with illustrative embodiments of the invention.

The process of FIG. 3A begins at step 301, in which a stylus 141 is mounted to the probe 140. For example, the stylus 141 may be selected from the stylus rack 150 and mounted to the probe 140.

At step 302, the CMM 100 detects the identity of the stylus 141. The identity of a stylus 141 may include the type of stylus (e.g., tactile; non-contact; optical), and/or may include information indicating the stylus's family (e.g., 3 centimeter single-headed stylus family; 2 centimeter, three-headed stylus family), and/or may include a specific identification (e.g., serial number of a stylus 141). In some embodiments, the CMM may detect the identity of a stylus 141 prior to coupling the stylus 141 to the probe 140, and may mount the stylus 141 to the probe 140 only after confirming the identity of the stylus 141. The process of FIG. 3B, discussed below, describes one process of detecting the identity of the stylus 141.

At step 303, the process assesses the identity of the stylus 141 to determine whether the stylus 141 meets a criterion for the measuring task to be performed by the CMM 100. For example, a given measurement process may specify that a measurement to be performed by the CMM 100, or a part of such a measurement, is to use a specific stylus 141, or stylus type or stylus family. For example, that specification may depend on the object to be measured, such that the specification correlates a stylus or stylus type or stylus family to the object.

The specification of that stylus 141 is a criterion, and step 303 assesses the identity of the stylus 141 to determine whether the stylus indicium 157 of the stylus 141 matches that criterion. For example, if the measuring task to be performed by the CMM 100 includes measuring an object 101 with a specific type of non-contact stylus, the process confirms that the stylus 141 is that specific type of non-contact probe.

If the identity of the stylus 141 is confirmed, the process continues to step 304, which measures the object 101. Otherwise, the process proceeds to step 305, at which a different stylus 141 may be selected, for example from the stylus rack 150, and the process loops back to step 302 to detect this new stylus 141. Alternately, in some embodiments, the reaction at step 305 includes suspending the process of preparing to measure the object 101, and alerting an operator or remote system (113) that an error has occurred.

Figure 3B:
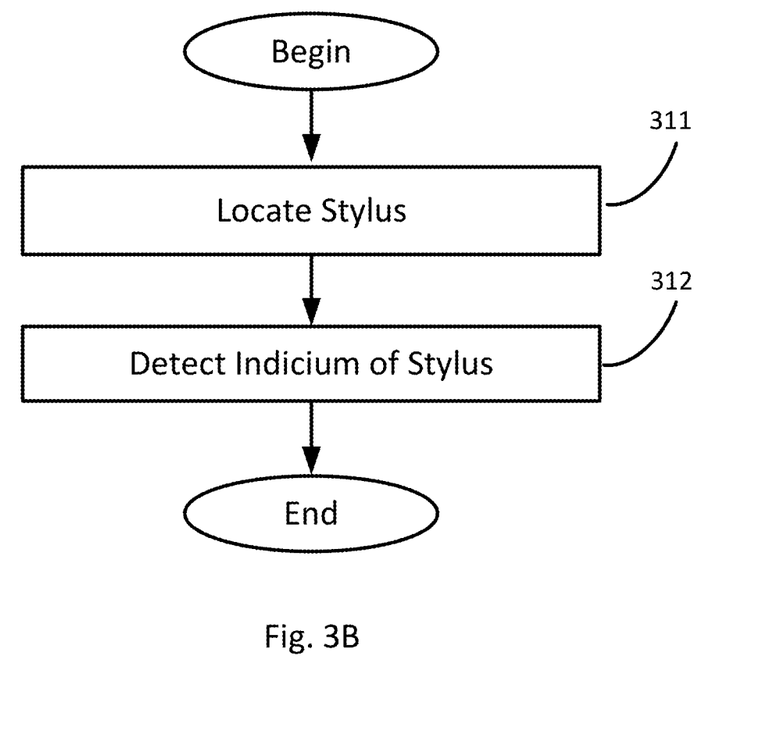
FIG. 3B shows a method of confirming a stylus for use by a CMM in accordance with illustrative embodiments of the invention.

FIG. 3B describes a process for detecting the identity of the probe 140 at step 303 of FIG. 3A.

The process of FIG. 3B begins at step 311, in which the process locates a stylus 141 to be identified. In some embodiments, the stylus 141 may be on a rack 150, or may already be attached to the CMM 100 (e.g., to a probe 140). The process may locate the stylus 141 by, for example, moving the arm 104 and probe 140 to the rack 150, or by detecting an image of the stylus 141 using camera 118 or other vision system.

Next, step 312 of the process detects an indicium 157 (e.g., some physical identifying apparatus) of the stylus 141. The indicium 157 of the stylus 141 indicates the identity of the stylus 141 with which the indicium 157 is associated. Generally, a stylus indicium 157 is not hidden or secret, but is unconcealed is unconcealed. For example, the stylus indicium 157 is at least partially exposed, is apparent and easily detectible from the outside of the stylus 141, for example with a camera 118, or by a probe 140 used by the coordinate measuring machine 100. The coordinate measuring machine 100 may detect the indicium 157 of the stylus 141 by use of a camera 118 under control of the controller 108, for example if the indicium 157 is a bar code or other visible feature, or by use of another probe 140 operated by the coordinate measuring machine 100, for example if the indicium 157 is a physical feature. In some embodiments, the stylus indicium 157 is passive, in that it can be read or assessed by the CMM 100 without requiring action by the indicium 157. Examples of a passive stylus indicium 157 include a bar code or other visible indicium, or a physical feature (e.g., a notch) that can be detected by the CMM 100.

Among other things, the indicium may identify the type of the stylus (e.g., tactile or non-contact), or may identify the family in which the stylus belongs, or may identify the specific stylus (e.g., by serial number). In other words, an indicium of a stylus 141 may distinguish one type of stylus 141 from another type of stylus 141, and/or may distinguish one stylus 141 from another stylus 141 (even if both styli 141 are of the same type).

Figure 1E:
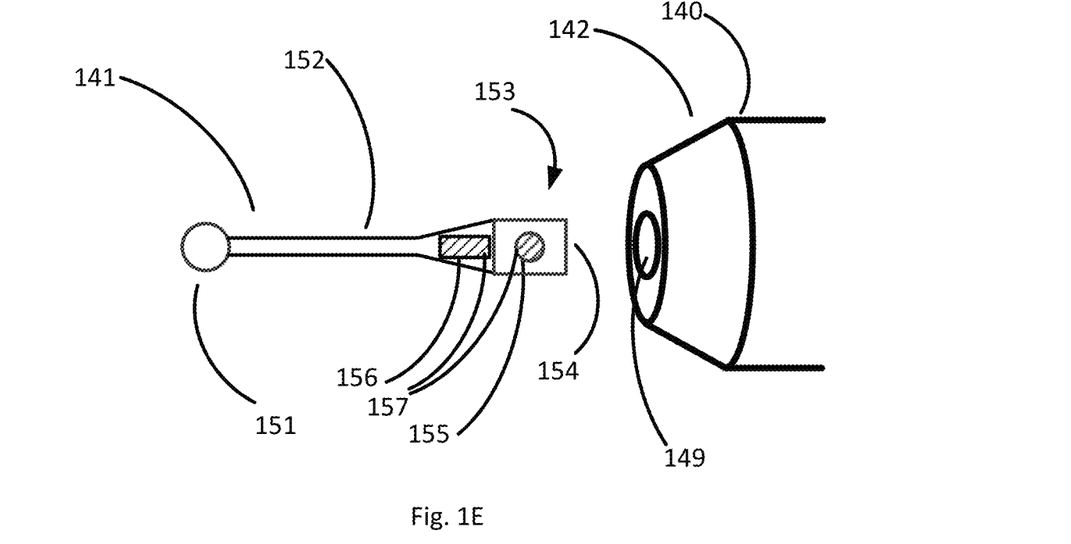
FIG. 1E schematically illustrates an embodiment of a stylus that may be used with illustrative embodiments.

Several embodiments of indicia are schematically illustrated in FIG. 1E, which includes a stylus 141 having a body 152 and a stylus tip 151. The stylus 141 mounts to the probe 140 by interface 149 using a physical interface 153. The physical interface 153 may include a physical feature 154 that uniquely identifies the stylus 141. The corresponding stylus interface 149 on the probe 141, alone or in concert with the controller 108 or computer 112, may confirm the identity of the stylus 141 by sensing the physical feature 154.

In another embodiment of an indicium 147, the body 152 of the stylus 141 includes a surface feature 155 that uniquely identify the stylus 141, and which may be detected by the CMM, for example using camera 118. For example, the surface feature 155 may include raised text, a color, or recesses in a specified pattern.

In another embodiment, the body 152 of the stylus 141 includes an identity interface 156 that uniquely identifies the stylus 141. For example, the identity interface 156 may be an optically readable feature such as bar code, color, or other optically-readable indicia that may be read by camera 118. In other embodiments, the interface 156 may be an electrical interface configured to make electrical contact with the CMM 100, and generate an electrical signal with a pattern that uniquely identifies the stylus 141. For example, this interface 156 may be a part of the probe interface 153 that couples with the probe 140.

In other embodiments, the interface 156 may be a transmitter, such as an RFID chip, that transmits an identifier that uniquely identifies the stylus 141, for example in response to a query from the CMM 100. In yet other embodiments, step 312 of FIG. 3B may identify a stylus 141 by measuring one or more physical features of the stylus 141, such as its length, width, or shape.

Illustrative Examples

The following is an illustrative example in which the object 101 has a specification that requires the CMM 100 to measure a first part of the object with a tactile probe 140. That requirement is a criterion, and using one or more embodiments described herein, the CMM 100 will select a tactile probe 140 for the operation. For example, there may be one or more probes 140 available to the CMM 100, including both tactile and non-tactile probes, so the CMM 100 assesses the probe indicium 147 for each available probe 140 until it finds a tactile probe 140 that meets the criterion. The CMM may then mount that tactile probe 140 to an arm 104, and proceed to measure the object.

As another example, the specification may require that a second part of the object 101 be measured by an optical probe 140, for example after measuring the first part of the object using the tactile probe 141. That requirement is a second criterion. The CMM 100 may again engage one or more of the embodiments disclosed herein to locate and identify an optical probe 140 that meets the second criterion. The CMM may then mount that optical probe 140 to an arm 104 (which may include replacing the tactile probe 140), and proceed to, or continue to, measure the second part of the object 101 using the optical probe 140.

The following is an illustrative example in which the object 101 has a specification that requires the CMM 100 to measure a first part of the object with a single-tip stylus 141. That requirement is a criterion, and using one or more embodiments described herein, the CMM 100 will select a single-tip stylus 141 for the operation. For example, there may be one or more styli 141 available to the CMM 100, including both single-tip styli 141 and multi-tip styli 141M, so the CMM 100 assesses the stylus indicium 157 for each available stylus (141; 141M) until it finds a single-tip stylus 141 that meets the criterion. The CMM may then mount that single-tip stylus 141 to a probe 140, and proceed to measure the object.

As another example, the specification may require that a second part of the object 101 be measured by a multi-tip stylus 141M. That requirement is a second criterion. The CMM 100 may again engage one or more of the embodiments disclosed herein to locate and identify a multi-tip stylus 141M that meets the second criterion. The CMM may then mount that a multi-tip stylus 141M to a probe 140 (which may include replacing the single-tip stylus 141), and proceed to, or continue to, measure the second part of object 101 with the multi-tip stylus 141M.

The following is a list of some reference numbers used herein:

- 100: Coordinate measuring machine ("CMM");
- 101: Object to be measured (e.g., workpiece);
- 102: Base of CMM;
- 103: Environment of CMM;
- 104: Moveable feature (e.g., arm);
- 106: Measuring device;
- 108: Control system;
- 111: Computer processor;
- 112: Host computer;
- 113: Remote device;
- 114: Network;
- 118: Camera;
- 119: Probe interface;
- 120: Data connection;
- 130: Probe rack;
- 140: Probe;
- 141: Stylus;
- 141M: Multi-tip stylus;
- 142: Probe body;
- 143: Probe physical interface;
- 144: Physical feature of probe (an embodiment of an indicium);
- 145: Surface feature of probe (an embodiment of an indicium);
- 146: Identify interface (an embodiment of an indicium);
- 147: Probe indicium, generally;
- 149: Stylus interface;
- 151: Stylus tip;
- 152: Stylus body;
- 153: Stylus physical interface;
- 154: Stylus physical feature (an embodiment of an indicium);
- 155: Stylus surface feature (an embodiment of an indicium);
- 156: Identity interface 156 (an embodiment of an indicium);
- 157: Stylus indicium, generally
- 190: Floor.

Various embodiments, such as the flow charts above, may be implemented at least in part in any conventional computer programming language. In some such embodiments, a nontransitory digital storage medium is encoded with instructions that, when executing on a computer processor, establish computer processes for performing a computer-implemented method of one or more of the processes and methods disclosed herein. As an example, in one embodiment, a nontransitory digital storage medium is encoded with instructions that, when executing on a computer processor, establish computer processes that detect an indicium of an available probe; assess whether the indicium of the available probe meets the criterion specified for the object to be measured; and control the a coordinate measuring machine to measure the object with the available probe, when the indicium meets the criterion.

For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits (ASICs), programmable gate arrays (e.g., FPGAs), and digital signal processor integrated circuits (DSPs), or other related components.

In an alternative embodiment, the disclosed apparatus and methods (e.g., see the various flow charts described above) may be implemented as a computer program product for use with a computer system. Such implementation may include a series of computer instructions fixed either on a tangible, nontransitory medium, such as a computer readable medium. The series of computer instructions can embody all or part of the functionality previously described herein with respect to the system. For example, some embodiments may be implemented by a processor (e.g., a microprocessor integrated circuit; digital signal processor integrated circuit) executing, or controlled by, instructions stored in a memory. The memory may be random access memory (RAM), read-only memory (ROM), flash memory or any other memory, or combination thereof, suitable for storing control software or other instructions and data.

Those skilled in the art should appreciate that such computer instructions can be written in a number of programming languages for use with many computer architectures or operating systems. Furthermore, such instructions may be stored in any memory device, such as semiconductor, magnetic, flash, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments, it should be apparent that those skilled in the art can make various modifications that will achieve some of the advantages of the invention without departing from the true scope of the inventions.

What is claimed is:

1. A computer-implemented method of operating a coordinate measuring machine to measure an object according to a criterion associated with the object, the criterion identifying a specific probe with which the object is to be measured, the method comprising:

providing at least one available probe, each available probe having a corresponding indicium;

selecting a given probe of the at least one available probe, the given probe having an indicium that meets the criterion specified for the object to be measured, the given probe being a selected probe;

robotically mounting the selected probe to a movable arm of the coordinate measuring machine; and controlling the coordinate measuring machine to measure the object with the selected probe.

2. The method of claim 1 wherein the criterion identifies a specific probe, and selecting a given probe includes assessing whether the indicium of the available probe meets the criterion to determine whether the available probe is the specific probe.

3. The method of claim 1 wherein the indicium is a passive indicium.

4. The method of claim 1 wherein the indicium is an optically-readable indicium.

5. The method of claim 1 wherein the indicium is a physical indicium that is configured to be detected by a touch probe on the coordinate measuring machine.

6. The method of claim 1 wherein selecting a given probe comprises assessing the indicium of a plurality of probes from among the at least one available probe until finding a probe that meets the criterion.

7. The method of claim 1 further comprising locating a second probe from the at least one available probe, when a first available probe from the at least one available probe fails to meet the criterion.

8. A coordinate measuring machine system operable to measure an object, the system comprising:

a moveable arm configured to move a probe, relative to the object to be measured;

a first probe configured to be removably coupled to the arm, the first probe comprising a first indicium;

a second probe configured to be removably coupled to the arm, the second probe comprising a second indicium that is distinguishable from the first indicium; and a controller configured to select, based on at least one of the first indicium and the second indicium, one of the first probe and the second probe for use by the coordinate measuring machine to measure the object, said probe being a selected probe.

9. The system of claim 8, wherein the controller is configured to robotically mount the selected probe to the moveable arm.

10. The system of claim 8, wherein the first indicium is a passive indicium.

11. The system of claim 8, wherein the first indicium is an optically readable indicium.

12. The system of claim 8, wherein the first indicium is a physical indicium that is configured to be detected by a touch probe on the coordinate measuring machine.

13. The system of claim 8, wherein the controller is further configured to measure the object with the selected probe mounted to the moveable arm.

14. The system of claim 8, wherein the controller is further configured to select one of the first probe and the second probe by correlating at least one of the first indicium and the second indicium to a probe criterion specified for the object.

15. A probe configured for mounting to a coordinate measuring machine, the coordinate measuring machine configured to couple to the probe and a second probe, the probe comprising:

a probe body; and a probe indicium associated with the probe body, the probe indicium configured to distinguish the probe from the second probe, the probe indicium being a physical indicium that is configured to be detected by a touch probe on the coordinate measuring machine.

16. The probe of claim 15, further comprising a physical interface configured to mount the probe to the coordinate measuring machine, the physical interface comprising an indicium in the form of a physical feature that uniquely identifies the probe or its type.

17. The probe of claim 15, further comprising an identity interface, the identity interface comprising an electrical interface configured to make electrical contact with the coordinate measuring machine and to generate an electrical signal with a pattern that uniquely identifies the probe.

18. The probe of claim 15, wherein the probe is configure to operate with a stylus, the probe further comprising:

a probe body; and a stylus interface configured to removably accept a stylus.

19. The probe of claim 18, wherein the stylus has an identity interface that identifies the stylus, the identify interface comprising an electrical interface configured:

to make electrical contact with the coordinate measuring machine though the stylus interface, and to generate an electrical signal with a pattern that uniquely identifies the stylus to the coordinate measuring machine when the stylus is coupled to the probe body.

20. The probe of claim 18, wherein the stylus has an identity interface that identifies the stylus, the identify interface comprising a physical feature that uniquely identifies the stylus when the stylus is coupled to the stylus interface, and the stylus interface is configured to confirm the identity of the stylus by sensing the physical feature.

* * * * *